(12) United States Patent
Kobayashi et al.

(10) Patent No.: US 8,310,817 B2
(45) Date of Patent: Nov. 13, 2012

(54) SOLID ELECTROLYTIC CAPACITOR HAVING PLURAL TERMINALS CONNECTED TO CANOPY AND PRODUCTION METHOD THEREOF

(75) Inventors: Masaaki Kobayashi, Tokyo (JP); Hironori Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 537 days.

(21) Appl. No.: 12/497,175

(22) Filed: Jul. 2, 2009

(65) Prior Publication Data

US 2010/0073848 A1 Mar. 25, 2010

(30) Foreign Application Priority Data

Sep. 25, 2008 (JP) ................... 2008-246654

(51) Int. Cl.
- *H01G 4/228* (2006.01)
- *H01G 9/10* (2006.01)
- *H01G 9/00* (2006.01)
- *H05K 5/03* (2006.01)

(52) U.S. Cl. ........ 361/538; 361/533; 361/540; 29/25.03

(58) Field of Classification Search .................. 361/532, 361/538, 540, 541, 523, 531, 533; 29/25.03
See application file for complete search history.

(56) References Cited

U.S. PATENT DOCUMENTS

| | | | | |
|---|---|---|---|---|
| 3,611,055 A | * | 10/1971 | Zeppieri et al. | 361/523 |
| 6,680,841 B2 | * | 1/2004 | Tadanobu et al. | 361/523 |
| 6,717,793 B2 | * | 4/2004 | Arai et al. | 361/306.1 |
| 6,912,117 B2 | | 6/2005 | Arai et al. | |
| 7,031,141 B2 | * | 4/2006 | Kuriyama | 361/528 |
| 7,057,882 B2 | * | 6/2006 | Fujii et al. | 361/540 |
| 7,646,589 B2 | * | 1/2010 | Kuriyama | 361/528 |
| 7,688,571 B2 | * | 3/2010 | Ishizuka et al. | 361/540 |
| 7,916,457 B2 | * | 3/2011 | Horio et al. | 361/541 |
| 2005/0168920 A1 | * | 8/2005 | Arai et al. | 361/528 |
| 2006/0056136 A1 | | 3/2006 | Fujii et al. | |
| 2006/0193106 A1 | * | 8/2006 | Kobayashi et al. | 361/540 |
| 2008/0094780 A1 | * | 4/2008 | Kuriyama | 361/523 |
| 2009/0237867 A1 | * | 9/2009 | Kurokawa | 361/540 |

FOREIGN PATENT DOCUMENTS

| | | | |
|---|---|---|---|
| DE | 3931249 A | * | 3/1991 |
| JP | 2004247665 A | * | 9/2004 |
| JP | A-2004-253615 | | 9/2004 |
| JP | A-2006-080423 | | 3/2006 |
| WO | WO 2006086972 A1 | * | 8/2006 |

* cited by examiner

*Primary Examiner* — David M Sinclair
(74) *Attorney, Agent, or Firm* — Oliff & Berridge, PLC

(57) ABSTRACT

In a solid electrolytic capacitor, a path of an electric current flowing from a lower layer to an upper layer of a laminate in cathode portions of respective capacitor elements connected through an electroconductive adhesive layer is opposite to paths of electric currents flowing from a canopy through joints to cathode terminals, thereby achieving reduction in ESL by mutual inductance effect in a simple structure. Since the solid electrolytic capacitor has the structure in which the laminate is surrounded by the canopy and joints, sufficient pressure resistance is ensured for the capacitor elements during resin injection. For this reason, a resin mold to cover the laminate can be formed by transfer molding, which ensures excellent heat resistance and moisture resistance.

3 Claims, 9 Drawing Sheets

SOLID ELECTROLYTIC CAPACITOR HAVING PLURAL TERMINALS CONNECTED TO CANOPY AND PRODUCTION METHOD THEREOF

BACKGROUND OF THE INVENTION

1. Field of the Invention

The present invention relates to a solid electrolytic capacitor and a production method thereof.

2. Related Background Art

A conventional solid electrolytic capacitor is a chip solid electrolytic capacitor, for example, as described in JP No. 2006-80423A. This conventional chip solid electrolytic capacitor is provided with the following two lead frames: an anode lead frame to which anode portions of capacitor elements are joined and which is provided with anode terminal portions for mounting; and a cathode lead frame to which cathode portions of the capacitor elements are joined and which is provided with cathode terminal portions for mounting.

This chip solid electrolytic capacitor uses the lead frames for converting the two-terminal capacitor elements with a pair of anode terminal and cathode terminal into a multi-terminal configuration, thus enabling multiterminal connections when mounted on a board. A direction of an electric current flowing in the anode lead frame is opposite to a direction of an electric current flowing in the cathode lead frame, thereby achieving reduction in ESL.

SUMMARY OF THE INVENTION

Incidentally, the foregoing conventional solid electrolytic capacitor is constructed in a structure in which the capacitor elements, anode lead frame, and cathode lead frame are finally sealed in an electrically insulating armor resin. A preferred sealing method is, for example, transfer molding to melt the sealing resin at a high temperature and pour the molten resin into a die in which the capacitor element is set, because it provides advantages of excellent heat resistance and moisture resistance. However, the structure of the conventional solid electrolytic capacitor had the problem that excessive pressure was likely to be exerted on the capacitor elements in an exposed state during resin injection.

On the other hand, with the solid electrolytic capacitor having the above-described terminal conversion structure, there are desires for a simpler structure capable of achieving the reduction in ESL, in terms of production cost and others. For this reason, it is a subject to realize a simple structure capable of achieving both of pressure resistance of the capacitor elements and reduction in ESL.

The present invention has been accomplished in order to achieve the above subject and an object of the present invention is to provide a solid electrolytic capacitor capable of achieving both the pressure resistance of the capacitor elements and the reduction in ESL in a simple structure, and a production method thereof.

In order to achieve the above object, a solid electrolytic capacitor according to the present invention is a solid electrolytic capacitor comprising: a laminate in which capacitor elements each having an anode portion and a cathode portion are laminated together; a resin mold covering the laminate and having an electrically insulating property; and plural pairs of anode terminals and cathode terminals connected to the anode portion and to the cathode portion and protruding from a bottom part of the resin mold, wherein the cathode portions of the respective capacitor elements are electrically connected to each other through an electroconductive material, and wherein the cathode terminals are electrically connected to each cathode portion by a canopy connected to the cathode portion of the capacitor element located in an uppermost layer of the laminate, so as to cover at least a part thereof, and joints extending between the canopy and the cathode terminals in a state in which the joints are separated from side faces of the laminate.

In this solid electrolytic capacitor, a path of an electric current flowing from a lower layer to an upper layer of the laminate in the cathode portions of the respective capacitor elements connected through the electroconductive material is opposite to paths of electric currents flowing from the canopy through the joints to the cathode terminals, thereby achieving reduction in ESL by mutual inductance effect in the simple structure. Since the laminate is surrounded by the canopy and joints, sufficient pressure resistance is ensured for the capacitor elements during resin injection. For this reason, the resin mold to cover the laminate can be formed by transfer molding, which ensures excellent heat resistance and moisture resistance.

In a preferred configuration, the anode terminals are electrically connected to each anode portion by a metal member fixed to the laminate so as to connect the anode portions, and an electroconductive sheet connected to the metal member and fixed to a bottom side of the laminate with a nonconductive material in between. This configuration enables the two-terminal capacitor elements to be converted into the multi-terminal capacitor in the simple structure.

In another preferred configuration, the anode terminals and the cathode terminals are alternately arranged on a first side face side in the laminate and on a second side face side opposed to the first side face. In this case, paths of electric currents flowing in the anode terminals are opposite to paths of electric currents flowing in the cathode terminals, thereby achieving further reduction in ESL.

In another preferred configuration, the canopy is of such a flat plate shape as to connect the joints. In this case, the laminate is surrounded more by the canopy, which further ensures the pressure resistance of the capacitor elements during resin injection.

A production method of a solid electrolytic capacitor according to the present invention is a method of producing the above-described solid electrolytic capacitor, the method comprising the steps of: preparing a first electroconductive sheet patterned with a base portion of a flat plate shape, cathode terminals protruding from the base portion, joints rising from the cathode terminals, and a canopy connected to tip ends of the joints; preparing a second electroconductive sheet patterned with a first mount portion on which the base portion can be mounted, a second mount portion on which the laminate can be mounted, and anode terminals protruding from the second mount portion; fixing the laminate through a nonconductive material to the second mount portion; laying and joining the first electroconductive sheet onto the second electroconductive sheet so that the base portion coincides with the first mount portion; filling a space between the canopy and the cathode portion of the capacitor element in the uppermost layer of the laminate with an electroconductive material; and covering the laminate by a resin mold having an electrically insulating property, so that the anode terminals and the cathode terminals protrude therefrom.

This production method of the solid electrolytic capacitor permits us to produce the solid electrolytic capacitor having the above-described configuration by the simple procedure of laying and joining the first electroconductive sheet with the pattern of the cathode terminals, joints, and canopy onto the second electroconductive sheet with the pattern of the anode terminals. In the solid electrolytic capacitor obtained, a path of an electric current flowing from a lower layer to an upper layer of the laminate in the cathode portions of the respective capacitor elements connected through the electroconductive material is opposite to paths of electric currents flowing from the canopy through the joints to the cathode terminals, thereby achieving reduction in ESL by mutual inductance effect in the simple structure. Since the laminate is surrounded by the canopy and joints, sufficient pressure resistance is ensured for the capacitor elements during resin injection. For this reason, the resin mold to cover the laminate can be formed by transfer molding, which ensures excellent heat resistance and moisture resistance.

The present invention achieves both the pressure resistance of the capacitor elements and the reduction in ESL in the simple structure.

DESCRIPTION OF THE PREFERRED EMBODIMENTS

The preferred embodiments of the solid electrolytic capacitor and production method thereof according to the present invention will be described below in detail with reference to the drawings.

Figure 1:
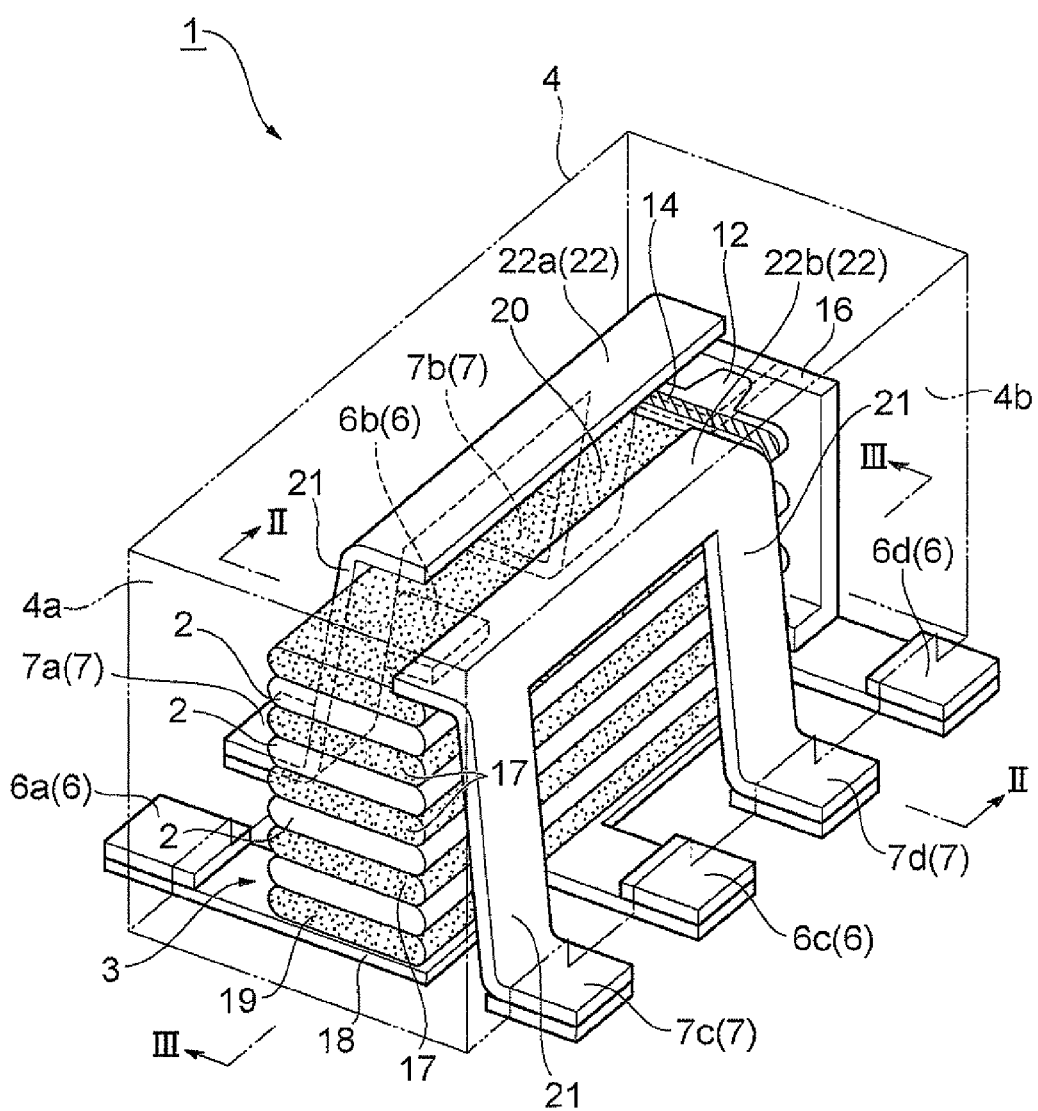
FIG. 1 is a perspective view showing an embodiment of the solid electrolytic capacitor according to the present invention.
Figure 2:
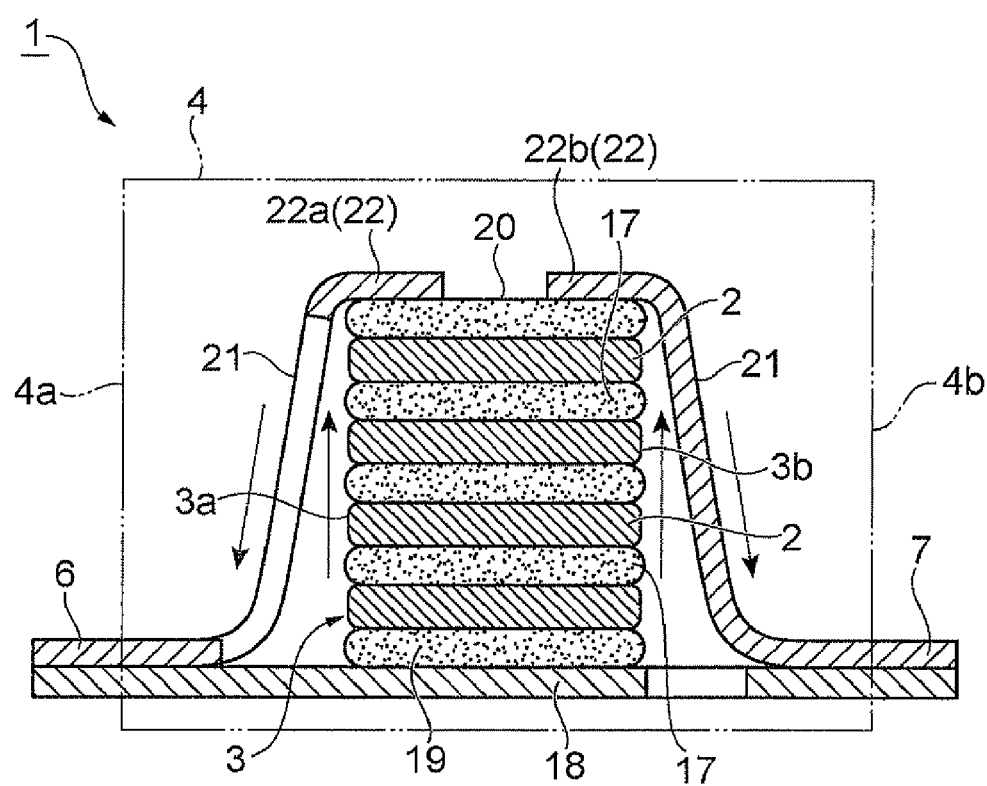
FIG. 2 is a sectional view along line II-II in FIG. 1.

FIG. 1 is a perspective view showing an embodiment of the solid electrolytic capacitor according to the present invention. FIG. 2 is a sectional view along line II-II in FIG. 1 and FIG. 3 a sectional view along line III-III thereof.

Figure 3:
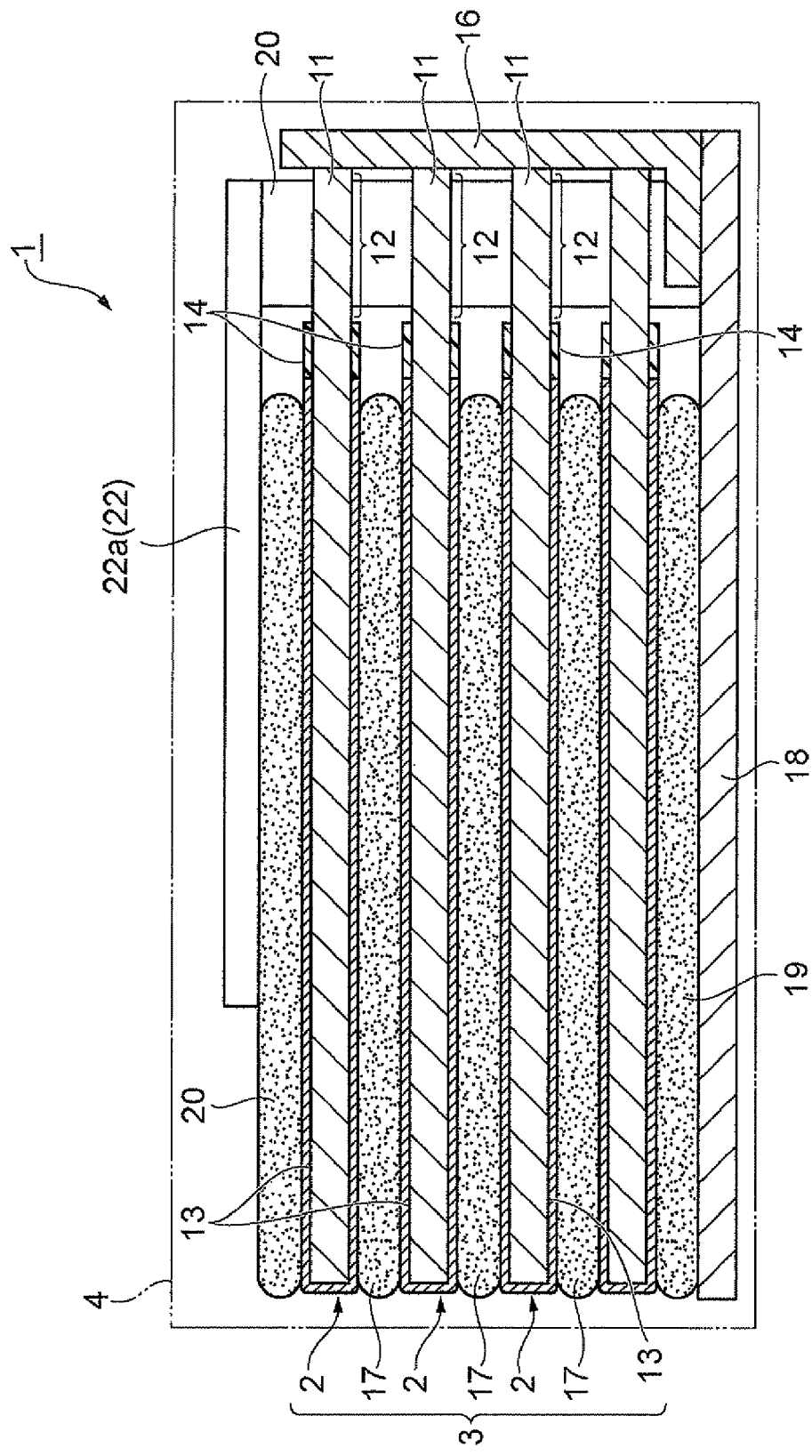
FIG. 3 is a sectional view along line III-III in FIG. 1.

As shown in FIGS. 1 to 3, the solid electrolytic capacitor 1 is provided with a laminate 3 in which a plurality of capacitor elements 2 are laminated together, a resin mold 4 having an electrically insulating property and covering the laminate 3, and plural pairs (four pairs in the present embodiment) of anode terminals 6 and cathode terminals 7 protruding from the bottom part of the resin mold 4.

Each capacitor element 2 has a foil-like or plate-like aluminum substrate 11. The surface of the aluminum substrate 11 is roughened so as to be porous, in order to increase the surface area thereof. An insulating aluminum oxide film (not shown) is formed on the porous surface of the aluminum substrate 11 by a chemical conversion treatment.

A one-end region of the aluminum substrate 11 subjected to the chemical conversion treatment is in a state in which the surface roughened structure is broken, and an anode portion 12 is formed therein. A cathode portion 13 is formed on the surface in the other-end region of the aluminum substrate 11 by successively laying a solid polymer electrolyte layer containing an electroconductive polymer compound, a graphite paste layer, and a silver paste layer thereon.

A resist portion 14 is formed in regions between anode portion 12 and cathode portion 13. This resist portion 14 is formed, for example, by applying an epoxy resin or the like by screen printing.

The anode portions 12 of the respective capacitor elements 2 are electrically connected to each other through a metal member 16 having an electrically conductive property. The metal member 16 is made, for example, of one of iron, nickel, copper, alloys thereof, and so on and is joined to each anode portion 12, for example, by laser welding. An electroconductive adhesive layer 17 is interposed between cathode portions 13 of the respective capacitor elements 2. The electroconductive adhesive layer 17 electrically connects the cathode portions 13 to each other and is made, for example, of a silver-epoxy adhesive.

The four pairs of anode terminals 6 and cathode terminals 7 each protrude at predetermined intervals from the bottom part of side face 4a corresponding to the width direction of the laminate 3 and from the bottom part of side face 4b facing the side face 4a, in the resin mold 4. The anode terminals 6 and cathode terminals 7 are alternately arranged. Specifically, when viewed from the near side in FIG. 1, anode terminal 6a, cathode terminal 7a, anode terminal 6b, and cathode terminal 7b are arranged in order on the side face 4a side, and cathode terminal 7c, anode terminal 6c, cathode terminal 7d, and anode terminal 6d are arranged in order on the side face 4b side.

In FIG. 1, each of the anode terminals 6a-6d and the cathode terminals 7a-7d is formed by laying two electroconductive sheets on each other by a below-described production method, but each terminal may be comprised of one electroconductive sheet in terms of structure.

The anode portions 12 of the respective capacitor elements 2 are connected to the anode terminals 6, using an electroconductive sheet 18 formed integrally with the anode terminals 6. The electroconductive sheet 18 is of a rectangular shape approximately similar to the planar shape of the capacitor elements 2 and is fixed to the bottom side of the laminate 3 with a nonconductive adhesive layer 19 in between. The base ends of the anode terminals 6a-6d are connected to side faces of the electroconductive sheet 18 and one end of the electroconductive sheet 18 is connected to a lower end of the metal member 16. This makes the anode portions 12 of the respective capacitor elements 2 and the anode terminals 6 electrically connected to each other. The nonconductive adhesive layer 19 is made, for example, of an epoxy resin containing no electroconductive fillers.

The cathode portions 13 of the respective capacitor elements 2 are connected to the cathode terminals 7, using joints 21 and canopy 22 made of the same material as the electroconductive sheet 18 and formed integrally with the cathode terminals 7. The joints 21, as shown in FIG. 2, rise from respective base ends of the cathode terminals 7a-7b as separated from side face 3a and side face 3b in the width direction of the laminate 3, and extend toward the cathode portion 13 of the capacitor element 2 located in the uppermost layer of the laminate 3.

The canopy 22 has a first portion 22a formed in such a belt-like shape as to connect an upper end of the joint 21 extending from the cathode terminal 7a and an upper end of the joint 21 extending from the cathode terminal 7b, and a second portion 22b formed in such a belt-like shape as to connect an upper end of the joint 21 extending from the cathode terminal 7c and an upper end of the joint 21 extending from the cathode terminal 7d.

The first portion 22a and second portion 22b of the canopy 22 are connected through an electroconductive adhesive layer 20 to the cathode portion 13 of the capacitor element 2 in the uppermost layer. The cathode portions 13 of the respective capacitor elements 2 and the cathode terminals 7 are electrically connected to each other by the joints 21 and canopy 22 described above. Since the joints 21 and canopy 22 are formed in the structure covering the laminate 3, they also function as a protecting member for enhancing the pressure resistance of the capacitor elements 2 during resin injection.

The resin mold 4 for sealing the laminate 3 is made, for example, by transfer molding using an epoxy resin. The resin mold 4 is of such a nearly rectangular parallelepiped shape as to cover the laminate 3, the base ends of the anode terminals 6a-6d, the base ends of the cathode terminals 7a-7d, the joints 21, and the canopy 22.

The following will describe a production method of solid electrolytic capacitor 1 having the above-described configuration. The laminate 3 can be produced by applying the well-known technology and the detailed description thereof is omitted herein.

For producing the solid electrolytic capacitors 1, two types of lead frame (first electroconductive sheet) 31 and lead frame (second electroconductive sheet) 41 are first prepared. The lead frames 31, 41 are made, for example, of Cu, Fe, Ni, or an alloy thereof and a pattern is formed therein as described below by a punching die.

Figure 4:
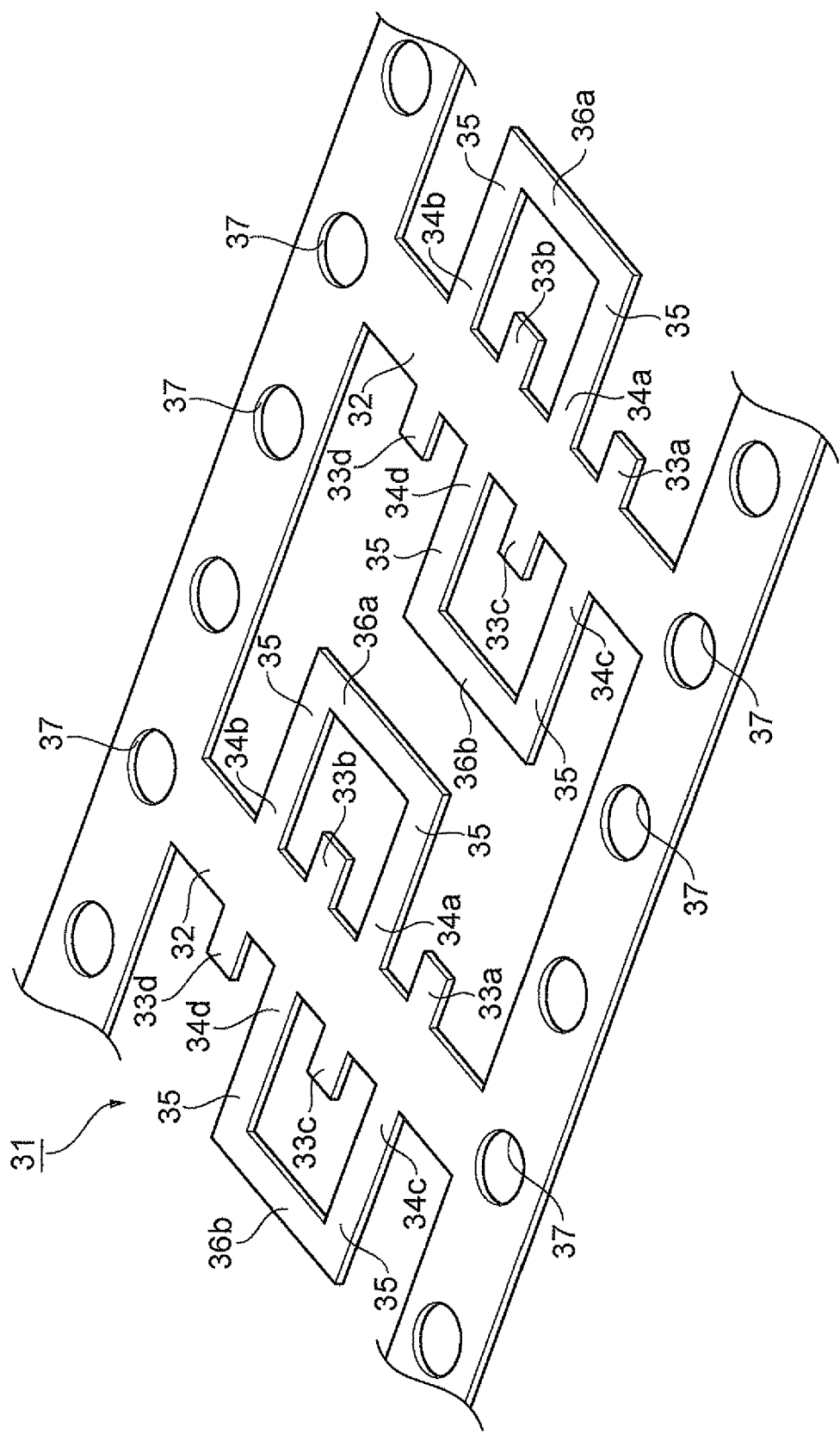
FIG. 4 is a perspective view showing one lead frame used in an embodiment of the production method of the solid electrolytic capacitor according to the present invention.

One lead frame 31, as shown in FIG. 4, is patterned with belt-like base portions 32, anode terminal equivalents 33a-33d and cathode terminal equivalents 34a-34d alternately protruding at predetermined intervals from the two side faces of the base portions 32, and joint equivalents 35 extending from the respective cathode terminal equivalents 34a-34d.

Figure 5:
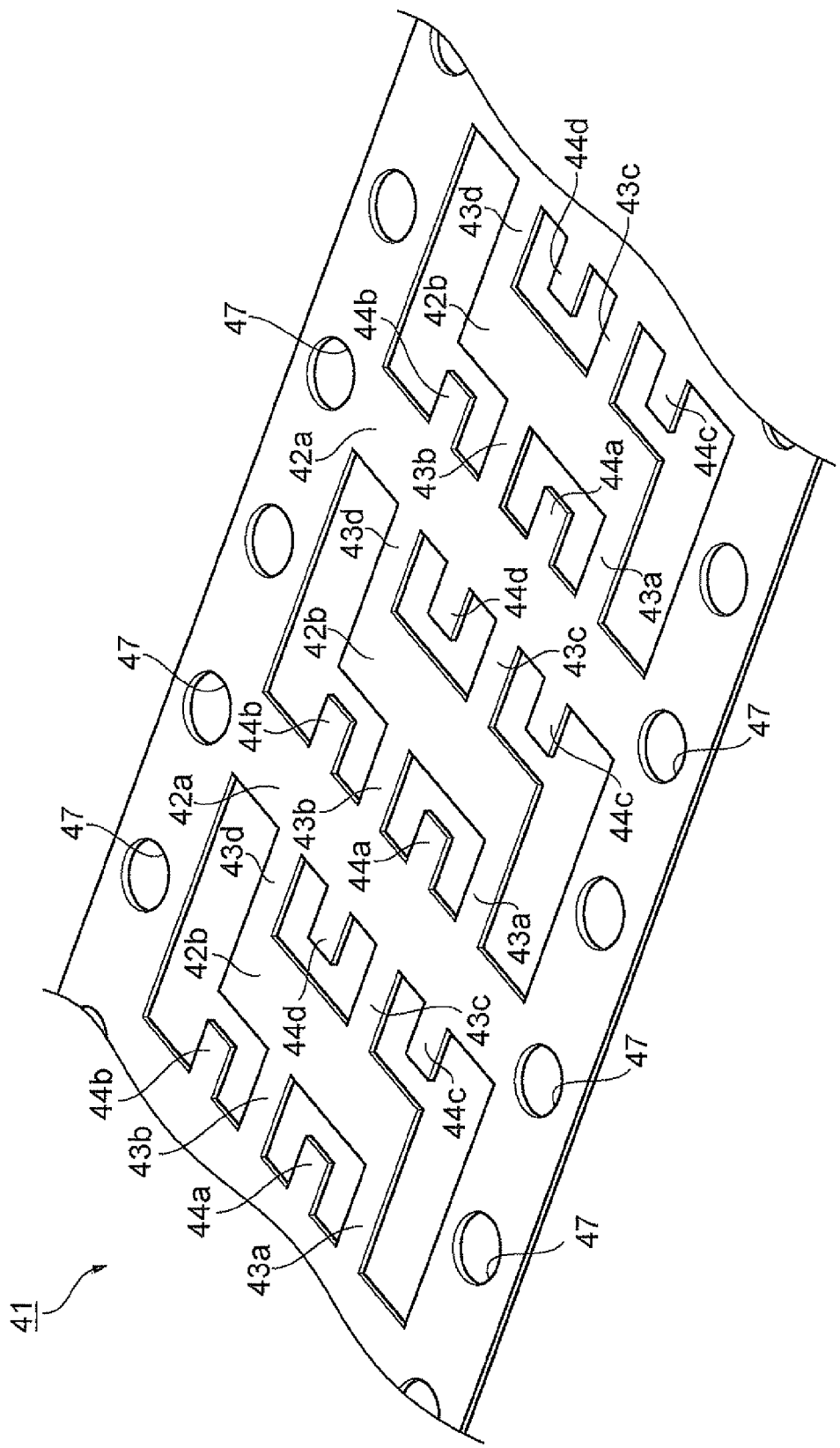
FIG. 5 is a perspective view showing another lead frame used in an embodiment of the production method of the solid electrolytic capacitor according to the present invention.

Furthermore, the lead frame 31 is so patterned as to also have first portion equivalents 36a for the first potion of canopy 22 each connecting a tip end of joint equivalent 35 extending from the cathode terminal equivalent 34a and a tip end of joint equivalent 35 extending from the cathode terminal equivalent 34b, and second portion equivalents 36b for the second portion of canopy 22 each formed in such a belt-like shape as to connect a tip end of joint equivalent 35 extending from the cathode terminal equivalent 34c and a tip end of joint equivalent 35 extending from the cathode terminal equivalent 34d. The other lead frame 41, as shown in FIG. 5, is patterned with belt-like first mount portions 42a on each of which the base portion 32 can be mounted, belt-like second mount portions 42b (portions each equivalent to the electroconductive sheet 18) each of which is positioned between first mount portions 42a, 42a and on each of which the laminate 3 can be mounted, anode terminal equivalents 43a-43d each connecting a side face of second mount portion 42b and a side face of first mount portion 42a adjacent thereto, and cathode terminal equivalents 44a-44d protruding from side faces of the first mount portions 42a as alternating with the anode terminal equivalents 43a-43d. The tip ends of the cathode terminal equivalents 44a-44d are separated from the side faces of second mount portion 42b.

Circular positioning holes 37 are provided at equal intervals in edge regions of the lead frame 31 so as to include positions corresponding to the base portions 32. Similarly, positioning holes 47 with the same diameter as the positioning holes 37 of the lead frame 31 are provided at equal intervals in edge regions of the lead frame 41, at positions corresponding to the first mount portions 42a and at positions corresponding to the second mount portions.

Figure 6:
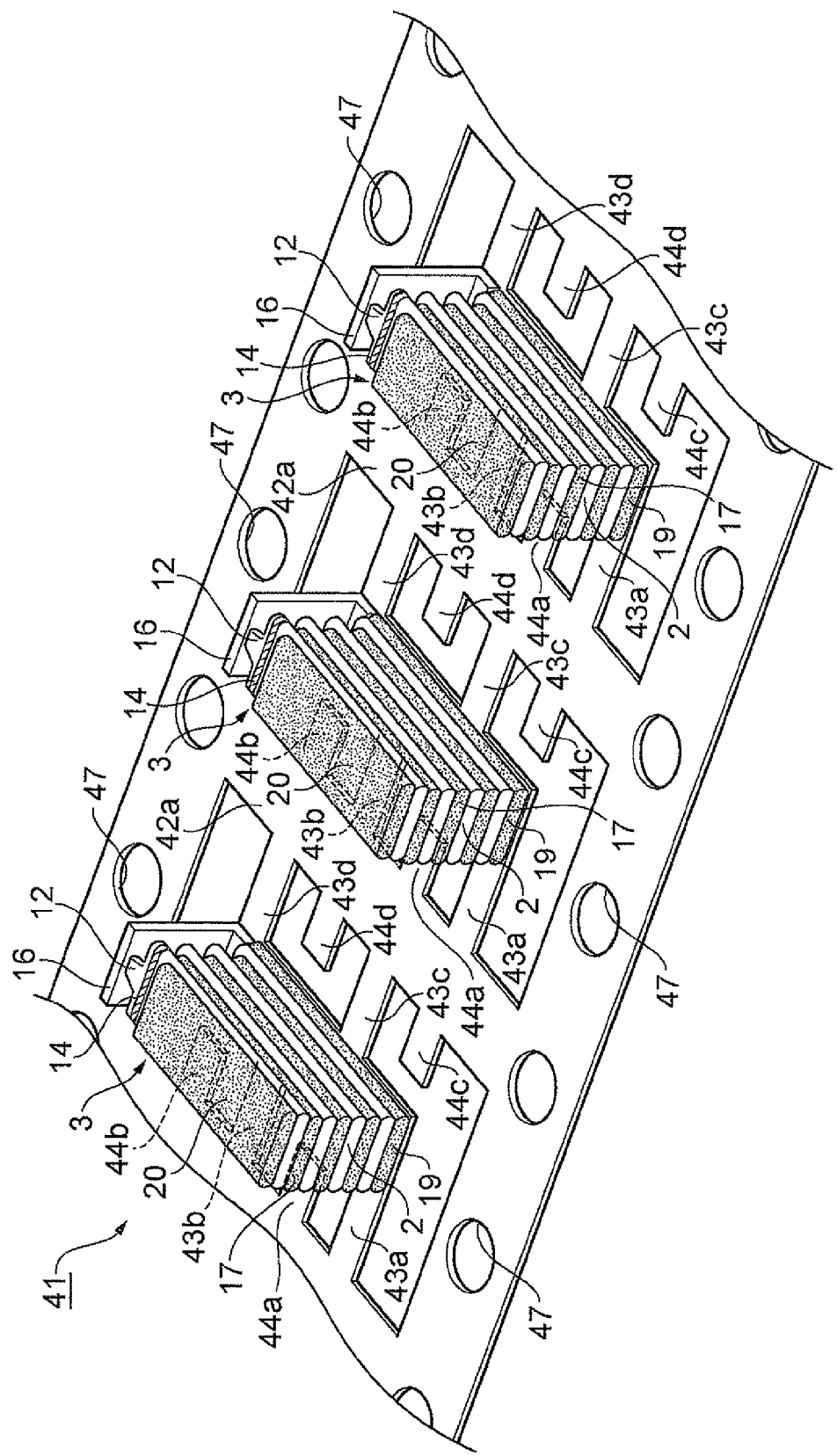
FIG. 6 is a perspective view showing a state in which laminates are mounted on the lead frame shown in FIG. 5.

Next, as shown in FIG. 6, the laminates 3 to each of which the metal member 16 is fixed, are mounted on the respective second mount portions 42b of the lead frame 41. At this time, the cathode portion 13 of the capacitor element 2 located in the lowermost layer of each laminate 3 is fixed through the nonconductive adhesive layer 19 to the second mount portion 42b and the lower end of the metal member 16 to which each anode portion 12 is connected, is fixed to the second mount portion 42b, for example, by YAG laser welding or soldering. Furthermore, the electroconductive adhesive layer 20 is formed on the surface of the cathode portion 13 of capacitor element 2 located in the uppermost layer of each laminate 3.

Figure 7:
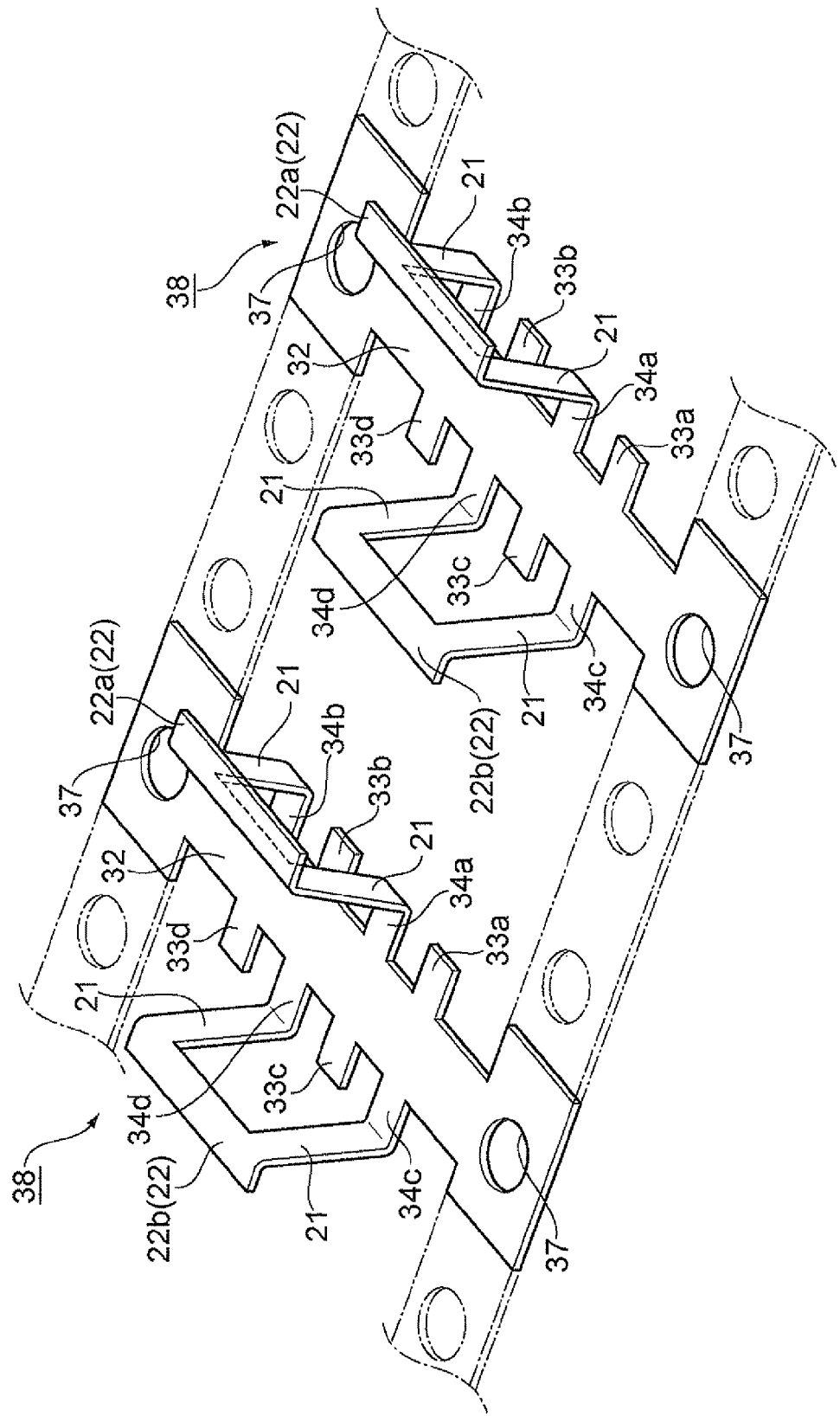
FIG. 7 is a perspective view showing a state in which the lead frame shown in FIG. 4 is bent.

As shown in FIG. 7, the joint equivalents 35 of the lead frame 31 are bent upward and processed so that the joint equivalents 35 rise from the tip ends of the cathode terminal equivalents 34a-34d. This process results in forming the joints 21. Furthermore, the first portion equivalents 36a and second portion equivalents 36b are bent at the tip ends of the joints 21 so as to be approximately parallel to the cathode terminal equivalents 34a-34d, thereby forming the first portion 22a and second portion 22b of each canopy 22. Thereafter, the edge regions of the lead frame 31 are cut so as to include the positioning holes 37, thereby obtaining frame bodies 38 each of which is an integral body of base portion 32, anode terminal equivalents 33a-33d, cathode terminal equivalents 34a-34d, joints 21, and canopy 22.

Figure 8:
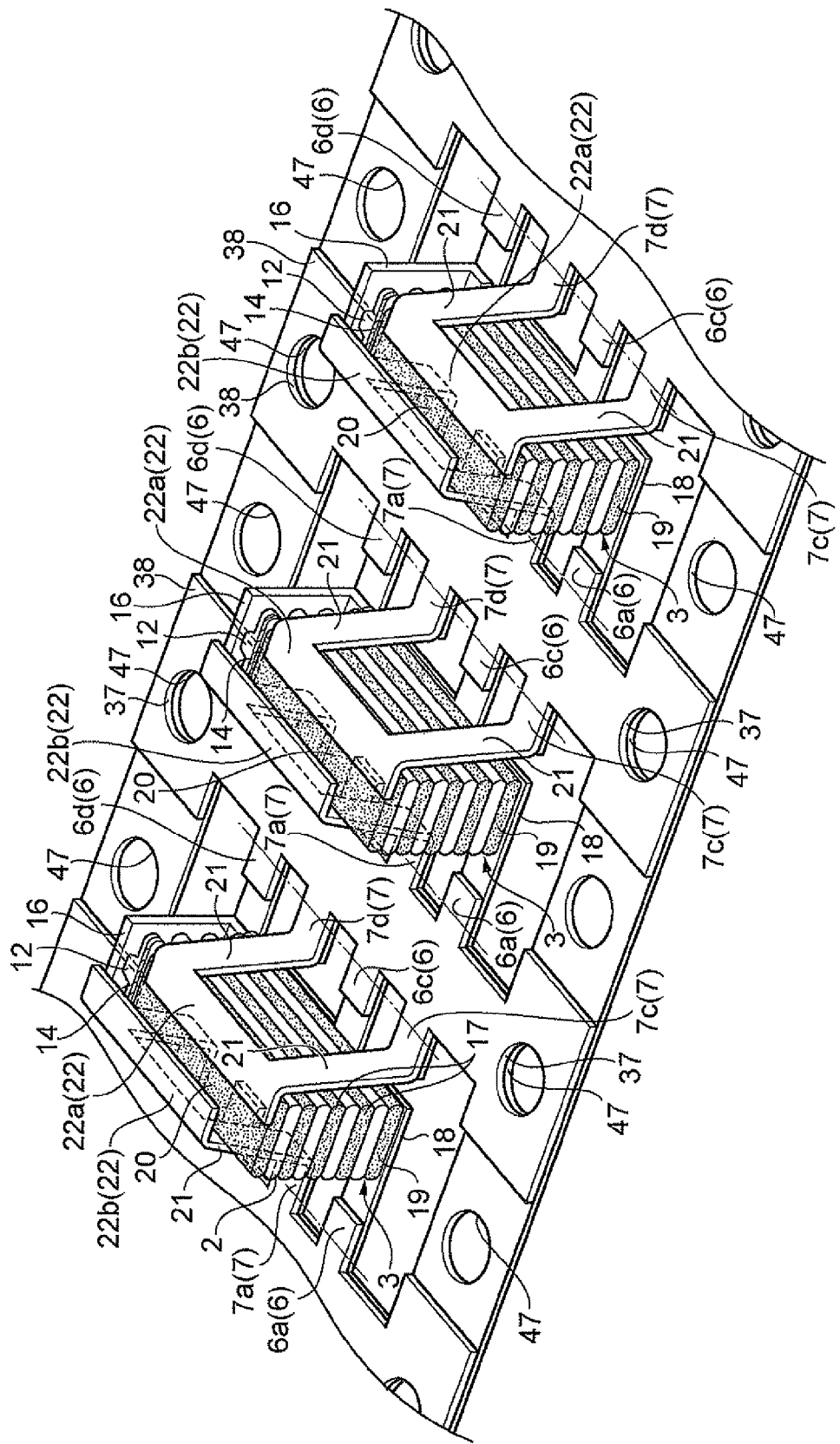
FIG. 8 is a perspective view showing a step subsequent to FIGS. 6 and 7.

Next, as shown in FIG. 8, the frame bodies 38 are laid on the lead frame 41 so that the positioning holes 37 and the positioning holes 47 coincide each other, whereby the base portions 32 of the frame bodies 38 are mounted on the first mount portions 42a of the lead frame 41. This makes the anode terminal equivalents 33a-33d and the anode terminal equivalents 43a-43d laid on each other and makes the cathode terminal equivalents 34a-34d and the cathode terminal equivalents 44a-44d laid on each other. The first portion 22a and the second portion 22b of canopy 22 located at the tip ends of the joints 21 are fixed through the electroconductive adhesive layer 20 to respective side regions of the cathode portion 13 of the capacitor element 2 in the uppermost layer of each laminate 3.

Then the overlap portions between the anode terminal equivalents 33a-33d and the anode terminal equivalents 43a-43d and the overlap portions between the cathode terminal equivalents 34a-34d and the cathode terminal equivalents 44a-44d are joined together, for example, by resistance welding or YAG laser welding to form the anode terminals 6a-6d and the cathode terminals 7a-7d. After the formation of the anode terminals 6a-6d and the cathode terminals 7a-7d, the nonconductive adhesive layers 19 and the electroconductive adhesive layers 20 are fully dried and cured.

Thereafter, an epoxy resin is poured into a predetermined die surrounding each laminate 3, for example, by transfer molding, to form the resin mold 4 of such a nearly rectangular parallelepiped shape as to cover the laminate 3, the base ends of the anode terminals 6a-6d, the base ends of the cathode terminals 7a-7d, the joints 21, and the canopy 22. Then the tip ends of the anode terminals 6a-6d and the tip ends of the cathode terminals 7a-7d are cut to be separated off from the overlap portions between the first mount portion 42a and the base portion 32, thereby completing the solid electrolytic capacitors 1 shown in FIGS. 1 to 3.

In the solid electrolytic capacitor 1, as described above, a path of an electric current flowing from the lower layer to the upper layer of the laminate 3 in the cathode portions 13 of the respective capacitor elements 2 connected through the electroconductive adhesive layers 17 is opposite to paths of electric currents flowing from the canopy 22 through the joints 21 to the cathode terminals 7 (cf. FIG. 2), thereby achieving reduction in ESL by mutual inductance effect in the simple structure. Since the capacitor has the structure in which the laminate 3 is surrounded by the canopy 22 and joints 21, sufficient pressure resistance is ensured for the capacitor elements 2 during resin injection. For this reason, the resin mold 4 to cover the laminate 3 can be formed by transfer molding, which ensures excellent heat resistance and moisture resistance.

The anode terminals 6 are electrically connected to each anode portion 12 by the metal member 16 fixed to the laminate 3 so as to connect the anode portions 12, and the electroconductive sheet 18 fixed to the bottom side of the laminate 3 with the nonconductive adhesive layer 19 in between. This configuration permits the two-terminal capacitor elements to be converted into the multi-terminal capacitor in the simple structure using the two types of lead frames 31, 41.

The anode terminals 6a-6d and the cathode terminals 7a-7d are alternately arranged on the side face 3a side and on the side face 3b side opposed thereto, in the laminate 3. This makes paths of electric currents flowing in the anode terminals 6 opposite to paths of electric currents flowing in the cathode terminals 7, which further enhances the reduction in ESL by mutual inductance effect.

The above-described production method of solid electrolytic capacitor 1 permits us to produce the solid electrolytic capacitor 1 by the simple procedure of laying and joining the lead frame 31 with the pattern of the cathode terminal equivalents 34a-34d, joints 21, and canopy 22 onto the lead frame 41 with the pattern of the anode terminal equivalents 43a-43d.

The present invention is by no means limited to the above embodiment. For example, in the above-described embodiment the nonconductive adhesive layer 19 is interposed between the cathode portion 13 of the capacitor element 2 in the lowermost layer of the laminate 3 and the electroconductive sheet 18, but a coating of a resist preliminarily applied on the surface of the electroconductive sheet 18 may be used instead of the nonconductive adhesive layer 19. The lead frames 31, 41 may be those with the surface plated with metal.

Figure 9:
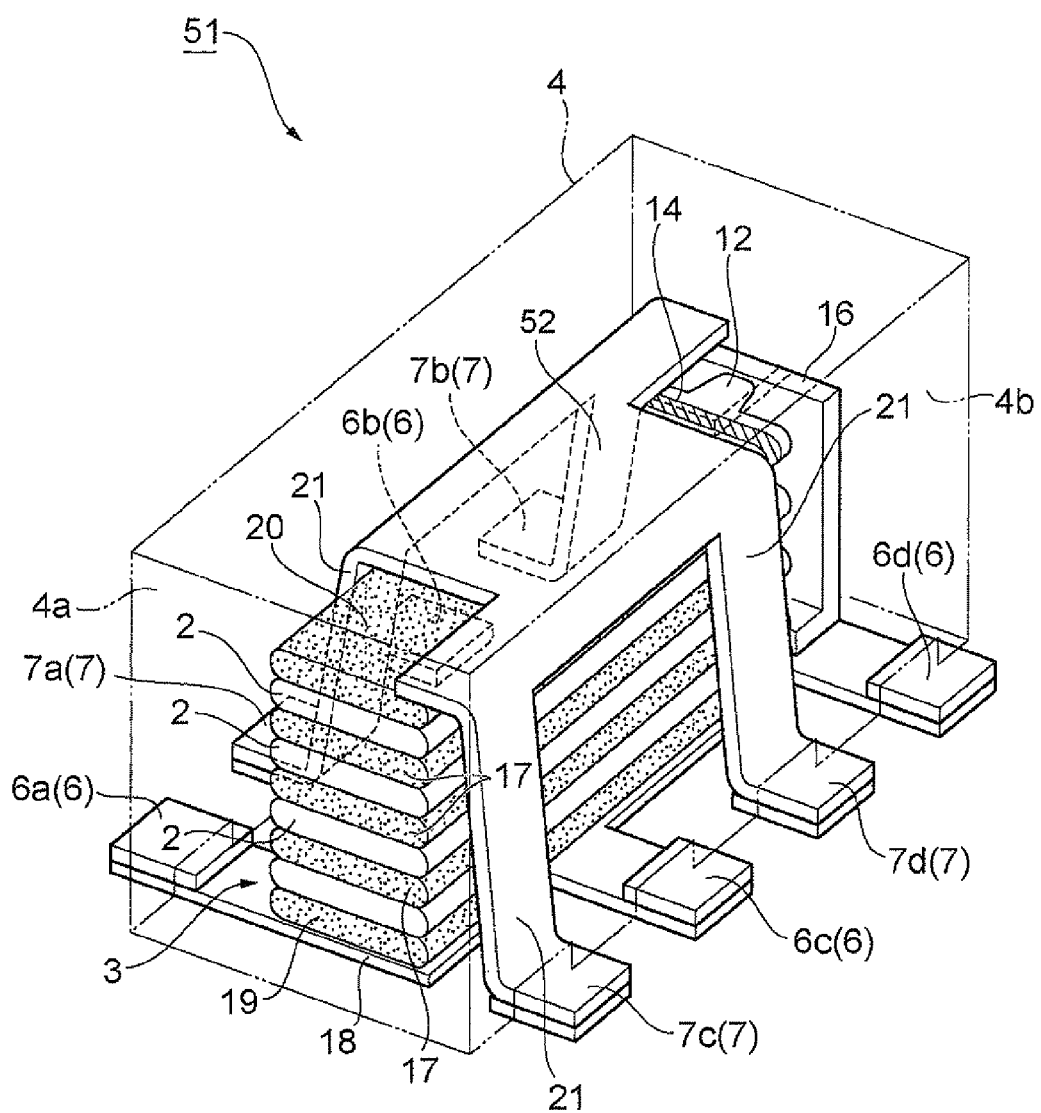
FIG. 9 is a perspective view showing a modification example of the solid electrolytic capacitor according to the present invention.

In the above-described embodiment the canopy 22 is composed of the first portion 22a and the second portion 22b in the separated state, but the canopy may be one 52 of such a flat plate shape as to connect all the joints 21 extending from the respective cathode terminals 7a-7d, for example, as in the solid electrolytic capacitor 51 shown in FIG. 9. In this case, the top side of the laminate 3 is surrounded more by the canopy 52, which can further ensure the pressure resistance of the capacitor elements 2 during resin injection.

What is claimed is:

1. A method for producing a solid electrolytic capacitor, the solid electrolytic capacitor comprising:
   a laminate in which capacitor elements each having an anode portion and a cathode portion are laminated together;
   a resin mold covering the laminate and having an electrically insulating property; and
   plural pairs of anode terminals and cathode terminals connected to the anode portion and to the cathode portion and protruding from a bottom part of the resin mold,
   wherein the cathode portions of the respective capacitor elements are electrically connected to each other through an electroconductive material, and
   wherein the cathode terminals are electrically connected to each cathode portion by a canopy connected to the cathode portion of the capacitor element located in an uppermost layer of the laminate, so as to cover at least a part thereof, and joints extending between the canopy and the cathode terminals in a state in which the joints are separated from side faces of the laminate, the canopy being of such a flat plate shape as to connect the joints,
   the method comprising the steps of:
   preparing a first electroconductive sheet patterned with a base portion of a flat plate shape, the cathode terminals and anode terminal equivalents alternately protruding from the base portion, the joints rising from the cathode terminals, and the canopy connected to tip ends of the joints;
   preparing a second electroconductive sheet patterned with a first mount portion on which the base portion can be mounted, a second mount portion on which the laminate can be mounted, the anode terminals protruding from the second mount portion, and cathode terminal equivalents protruding from the first mount portion;
   fixing the laminate through a nonconductive material to the second mount portion;
   laying the first electroconductive sheet onto the second electroconductive sheet so that the base portion coincides with the first mount portion, joining the anode terminal equivalents of the first electroconductive sheet and the anode terminals of the second electroconductive sheet, and joining the cathode terminals of the first electroconductive sheet and the cathode terminal equivalents of the second electroconductive sheet;
   filling a space between the canopy and the cathode portion of the capacitor element in the uppermost layer of the laminate with the electroconductive material; and
   covering the laminate by the resin mold, so that the anode terminals and the cathode terminals protrude therefrom.

2. The method according to claim 1, wherein the anode terminals are electrically connected to each anode portion by a metal member fixed to the laminate so as to connect the anode portions, and an electroconductive sheet connected to the metal member and fixed to a bottom side of the laminate with a nonconductive material in between.

3. The method according to claim 1, wherein the anode terminals and the cathode terminals are alternately arranged on a first side face side in the laminate and on a second side face side opposed to the first side face.

* * * * *